Sept. 16, 1958 W. R. LUNDRY 2,852,751

DELAY EQUALIZER NETWORK

Filed Jan. 21, 1954

INVENTOR
W. R. LUNDRY
BY
Ralph T. Holcomb
ATTORNEY

United States Patent Office 2,852,751

Patented Sept. 16, 1958

2,852,751

DELAY EQUALIZER NETWORK

Walter R. Lundry, Summit, N. J., assignor to Bell Telephone Laboratories, Incorporated, New York, N. Y., a corporation of New York Application January 21, 1954, Serial No. 405,344

12 Claims. (Cl. 333—28)

This invention relates to wave transmission networks and more particularly to all-pass networks of the type used as phase correctors or delay equalizers.

An object of the invention is to shift the phase of a transmitted signal wave without introducing attenuation. More specific objects are to reduce the size and cost, improve the transmission characteristic, and facilitate the adjustment of phase-shifting networks.

For high quality transmission over long transmission circuits, it is necessary to correct the phase distortion, as well as the attenuation distortion, of the transmitted signal. Phase-shifting networks, or delay equalizers, are employed for this purpose. Such phase-compensating networks are particularly required in transmission circuits carrying television, high fidelity program, or telephoto service.

The phase-shifting networks in accordance with the present invention employ one or more negative resistances in order to reduce the number of reactance elements required, decrease the transmission loss, and simplify the adjustment procedure. In the two simpler embodiments, a single coupling branch is interposed between the wave source and the load. The source and the load are preferably non-reactive but they may be either equal or unequal. The coupling branch comprises a reactive impedance and a negative resistance connected thereto. The amount of phase shift introduced by the network depends upon the complexity of the reactive impedance which includes one or more reactors. The negative resistance has a substantially constant value so chosen with respect to the impedance of the source and the load that the network has an all-pass transmission characteristic. In one embodiment, the coupling branch is connected in parallel with the source and the load, the impedance and the negative resistance are connected in series, and the negative resistance has a value approximately equal to half the impedance of the source and the load in parallel. In a second embodiment, the coupling branch is connected in series with the source and the load, the impedance and the negative resistance are connected in parallel, and the negative resistance is approximately equal to twice the impedance of the source and the load in series. The third embodiment incorporates the two branches in a bridged-T structure which has a constant-resistance image impedance. The reactive impedance may be made adjustable to permit adjustment of the phase or delay characteristic of the network. The negative resistance also may be made adjustable, if desired.

For a given characteristic, the single-branch networks effect a saving in reactors of half as compared with the bridged-T, and three-quarters as compared with the lattice. The networks also simplify the adjustment procedure where an adjustable characteristic is required. For example, an adjustable 360-degree phase-shifting section in accordance with the invention requires only a single adjustable reactor, either an inductor or a capacitor. The equivalent lattice, on the other hand, requires the simultaneous adjustment of four elements. These are two equal inductors and two equal capacitors. Futhermore, an inverse relationship must be maintained between each capacitance and the associated inductance. The corresponding bridged-T requires the simultaneous adjustment of both an inductance and a capacitance with inverse relationships. Without using coupled inductors, the bridged-T form of the invention can be designed to have characteristics which require mutual inductance in the previously known bridged-T structures. In all three embodiments, the use of negative resistance permits compensating the dissipation in the component reactors, thereby improving the transmission characteristic by reducing undesired attenuation.

The nature of the invention and its various objects, features, and advantages will appear more fully in the following detailed description of preferred embodiments illustrated in the accompanying drawing, of which Fig. 1 shows the general circuit of one form of a phase-shifting network in accordance with the invention in which the single coupling branch is connected in parallel with the source and the load;

Figure 1:
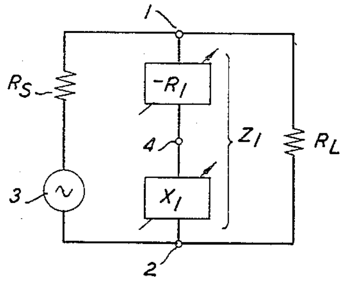

In the phase-shifting network shown in Fig. 1, the coupling branch $Z_1$ between the terminals 1 and 2 is connected in parallel with a source 3 of alternating-current signals having an internal impedance $R_S$ and a load impedance $R_L$. The impedances $R_S$ and $R_L$ are preferably substantially non-reactive but they may be either equal or unequal. The branch $Z_1$ comprises a reactive impedance $X_1$, between the terminals 1 and 4, connected in series with a negative resistance $-R_1$ of the series type. The impedance $X_1$ determines the phase-shift characteristic of the network and may be made adjustable, as indicated by the arrow, for adjusting the characteristic. It may, for example, be a single inductor or capacitor or it may include any appropriate combination of inductors and capacitors. The negative resistance may also be made adjustable, as indicated.

It can be shown that, when the value of the negative resistance $-R_1$ is properly related to the values of terminal impedances, the network will have an all-pass transmission characteristic, with zero or negligible insertion loss over the operating frequency range. For the circuit of Fig. 1, the required magnitude of the negative resistance is equal to half the impedance of the source and the load connected in parallel. Thus, $$R_1=\frac{R_S R_L}{2(R_S+R_L)} \qquad (1)$$

If $R_S$ and $R_L$ are equal and each equal to $R_0$, $R_1$ is equal to $R_0/4$. The effect of the undesired dissipation in the reactive impedance $X_1$ may be substantially eliminated, thereby reducing the insertion loss, by increasing the magnitude of the negative resistance $-R_1$ by an amount equal to the effective series resistance of $X_1$ at some selected frequency within the operating range.

Figure 2:
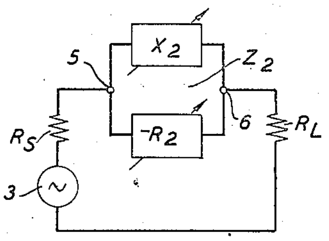
Fig. 2 shows the general circuit of a second form in which the coupling branch is connected in series between the source and the load.

The network shown in Fig. 2 is the dual of the one shown in Fig. 1. In Fig. 2, the coupling branch $Z_2$ between the terminals 5 and 6 is connected in series with the terminal impedances $R_S$ and $R_L$ which, again, may be equal or unequal. In this case, the branch $Z_2$ is made up of a reactive impedance $X_2$ in parallel with a negative resistance $-R_2$ of the shunt type. As before, $X_2$ may be of any degree of complexity and it, as well as the negative resistance, may be adjustable, as indicated. For an all-pass structure, the required magnitude of the negative resistance is equal to twice the impedance of the source and load connected in series. Therefore, $$R_2=2(R_S+R_L) \qquad (2)$$

and for equal terminal impedances $R_0$, $R_2$ is equal to $4R_0$. In this circuit, also, the insertion loss may be reduced by increasing the magnitude of the negative conductance $-1/R_2$ by an amount equal to the effective parallel conductance of $X_2$.

Figure 3:
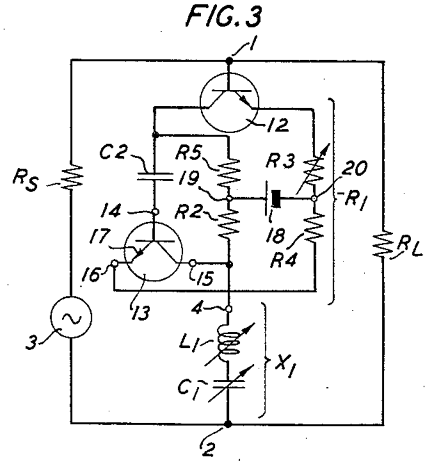
Fig. 3 is a schematic circuit of a specific embodiment of the type shown in Fig. 1 in which the phase shift is 360 degrees.

Fig. 3 shows a specific embodiment of a phase-shifting network of the type shown in Fig. 1, with the corresponding terminals similarly numbered. It is assumed that the desired maximum phase shift is 360 degrees. This requires one inductor $L_1$ and one capacitor $C_1$ in the reactive impedance $X_1$. It is further assumed that zero phase shift is desired at zero frequency. Therefore, $L_1$ and $C_1$ are connected in series between the terminals 2 and 4, as shown. The phase shift increases to 180 degrees at the resonant frequency of $L_1$ and $C_1$, and reaches its maximum value at infinite frequency. The shape of the phase-frequency characteristic, and consequently the delay characteristic, depends upon the ratio of $L_1$ to $C_1$ and may be adjusted by adjusting $L_1$ or $C_1$, or both, as indicated by the arrows.

The negative resistance $-R_1$ effective between the terminals 1 and 4 is of the series type, that is, one which is current-controlled or open-circuit stable. It may be provided by any suitable circuit. In Fig. 3, the circuit includes two transistors 12 and 13 each having a base, a collector, and an emitter. In the transistor 13, these are connected, respectively, to the terminals 14, 15 and 16. The transistors may be either the point-contact type or the junction type, but the latter are preferred because, in general, they provide a more constant value of negative resistance for given applied potentials. Transistors of the junction type are described in detail, for example, in the paper by William Shockley entitled "The Theory of p-n Junctions in Semiconductors and p-n Junction Transistors," published in the Bell System Technical Journal, vol. XXVIII, pages 435 to 489, July, 1949, and those of the point-contact type in United States Patent 2,524,035, to John Bardeen and Walter H. Brattain, issued October 3, 1950. In Fig. 3, the symbol used for the transistors 12 and 13 indicates that they are of the junction type, inasmuch as the arrowhead 17 associated with the emitter points toward the terminal 16. In the symbol for a point-contact transistor, this arrowhead is reversed.

The terminal 1 is connected to the base of the transistor 12 and the terminal 4 to the collector terminal 15 of the transistor 13. The negative-resistance circuit also includes a capacitor C2 connected between the collector of the transistor 12 and the base of the transistor 13, two resistors R5 and R2 connected in series between the collectors, two other resistors R3 and R4 connected in series between the emitters, and a source of direct voltage 18 connected between the common terminal 19 of the resistors R5, R2 and the common terminal 20 of the resistors R3, R4. The magnitude of the negative resistance effective between the terminals 1 and 4 depends in part upon the values of the emitter resistors R3 and R4, and a convenient way of controlling it is by adjusting the value of one or both of these. As indicated by the arrow, the resistor R3 is adjustable in the circuit shown. This circuit is described in greater detail in an application of John T. Bangert, Serial No. 307,687, filed September 3, 1952, now Patent No. 2,730,680, January 10, 1956.

Figure 4:
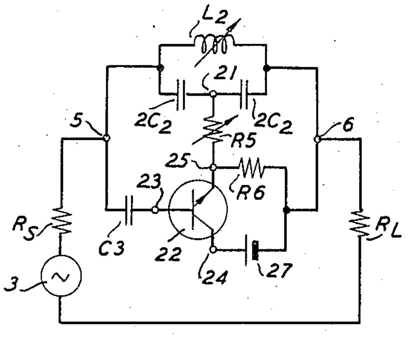
Figs. 4 and 5 are schematic circuits of specific embodiments following Fig. 2 in which the phase shift is also 360 degrees.

Fig. 4 shows in detail an embodiment of the type of network shown in Fig. 2. This is a dual of the circuit of Fig. 3 and may be designed to provide similar phase-frequency characteristics. The reactive impedance $X_2$ comprises an inductor $L_2$ shunted by two equal series-connected capacitors each of value $2C_2$. Two capacitors are used in order to provide a tapping point 21. The phase shift of the network rises from zero at zero frequency to 180 degrees at the antiresonant frequency of $X_2$, and to 360 degrees at infinite frequency.

The remaining elements between the terminals 5 and 6 constitute a three-terminal device which, in conjunction with $X_2$, provides a negative resistance of the shunt type, that is, one which is voltage-controlled or short-circuit stable. The circuit comprises a transistor 22, which may be either of the point-contact type or the junction type, having a base, a collector, and an emitter connected, respectively, to the terminals 23, 24, and 25. The circuit also includes a capacitor C3 connected between the transistor base terminal 23 and the terminal 5, a resistor R5 between the emitter terminal 25 and the tapping point 21, a resistor R6 between the terminal 25 and the terminal 6, and a source of direct voltage 27 between the collector terminal 24 and the terminal 6. The resistor R5 may be made adjustable, as indicated by the arrow, to control the magnitude of the negative resistance. This circuit is described in greater detail in another application of John T. Bangert, Serial No. 306,429, filed August 26, 1952, now Patent No. 2,733,415, January 31, 1956.

Figure 5:
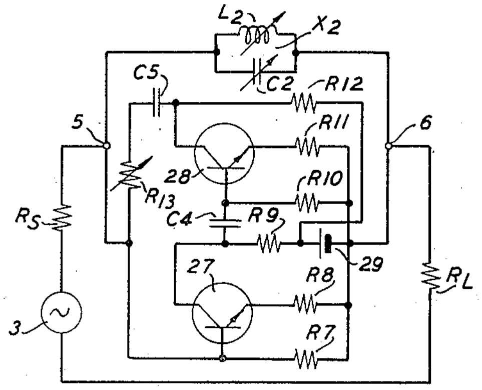

Fig. 5 shows another network in accordance with the invention, also following Fig. 2, which may be designed to have the same type of phase characteristics as the networks of Figs. 3 and 4. Fig. 5 differs from Fig. 4 principally in the substitution of a two-terminal, two-transistor network for a three-terminal, single-transistor network to furnish a negative resistance $-R_2$ of the shunt type effective between the terminals 5 and 6. The reactive impedance $X_2$ is made up of an inductor $L_2$ and a single capacitor $C_2$ in parallel. The negative-resistance circuit comprises the transistors 27 and 28, a source of direct voltage 29, two capacitors C4 and C5, and seven resistors designated R7 to R13.

The terminal 5 is connected to the base of the transistor 27. The terminal 6 is connected through the resistor R8 to the emitter of the transistor 27, and through the resistor R11 to the emitter of the transistor 28. The transistors are coupled by a resistance-capacitance network comprising the resistor R9 connected between the collector of the transistor 27 and the positive side of the voltage source 29, the capacitor C4 between the collector of the transistor 27 and the base of the transistor 28, and the resistor R10 between the base of the transistor 28 and the terminal 6. In order to reduce gain variations and thereby stabilize the negative resistance, each emitter is provided with an electrical path to the associated base which includes resistance. In the transistor 27, this path includes the resistors R7 and R8, and in the transistor 28 it includes the resistors R10 and R11. In some cases, the resistors R7 and R10 may be omitted. The resistor R12 connected between the collector of the transistor 28 and the positive terminal of the voltage source 29 is in the nature of a load. The voltage source 29, connected on the negative side to the terminal 6, supplies current through the resistor R9 to the collector of the transistor 27, and through the resistor R12 to the collector of the transistor 28. An alternating-current feedback path including the resistor R13 is provided between the collector of the transistor 28 and the base of the transistor 27. As indicated by the arrow, this resistor may be made adjustable so that the magnitude of the negative resistance effective between the terminals 5 and 6 may be controlled. The capacitor C5 is included in this path in order to keep the direct-current voltage from the source 29 off of the base of the transistor 27. This circuit is described in more detail in an application of John T. Bangert, Serial No. 306,430, filed August 26, 1952, now Patent No. 2,728,053, December 20, 1955.

Figure 6:
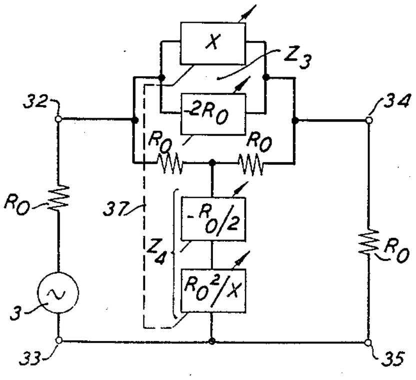
Fig. 6 shows the generalized circuit of a constant-resistance, bridged-T, all-pass network in accordance with the invention.

In Fig. 6, coupling branches of the types shown in Figs. 1 and 2 are incorporated in a bridged-T structure having a pair of input terminals 32, 33 and a pair of output terminals 34, 35. The network has a constant-resistance image impedance $R_0$ which matches the impedance of the source 3 and the load. The series arms of the T are constituted by two equal resistors each of value $R_0$. The bridging branch $Z_3$, of the same form as the series branch $Z_2$ of Fig. 2, comprises a reactive impedance X shunted by a negative resistance of value $-2R_0$. The shunt branch $Z_4$, of the same form as the shunt branch $Z_1$ of Fig. 1, is made up of a negative resistance of value $-R_0/2$ in series with a reactive impedance equal to $R_0^2/X$. It will be noted that the branches $Z_3$ and $Z_4$ are inverse with respect to $R_0^2$, that is, their product is equal to $R_0^2$. To permit adjustment of the phase or delay characteristic, the impedances X and $R_0^2/X$ may be made adjustable, as indicated by the arrows. They are preferably under unitary control, as indicated by the broken line 37, so that the required inverse relationship may be maintained at every setting. The negative resistances may also be adjustable, as indicated.

It is to be understood that the above-described arrangements are illustrative of the application of the principles of the invention. Numerous other arrangements may be devised by those skilled in the art without departing from the spirit and scope of the invention. For example, each of the reactive impedances X, $X_1$, and $X_2$ may have any required degree of complexity and any appropriate configuration. Each may comprise any number of reactors, including a single inductor or capacitor. Also, any suitable circuits may be substituted for the negative-resistance networks shown in Figs. 3, 4, and 5. They may, for example, comprise thermionic devices instead of transistors.

What is claimed is:

1. An all-pass wave transmission network comprising, in combination with a resistive wave source and a resistive load, a branch forming a common portion of two meshes which include, respectively, the source and the load, the branch comprising the series combination of a reactive impedance and a substantially constant negative resistance approximately equal in value to half the impedance of the network as viewed from the branch.

2. A network in accordance with claim 1 in which said source and said load have substantially equal impedances.

3. A network in accordance with claim 1 in which said reactive impedance is adjustable.

4. A network in accordance with claim 1 in which said negative resistance is adjustable.

5. An all-pass wave transmission network comprising, in combination with a resistive wave source and a resistive load, a branch forming part of a mesh which includes the source and the load, the branch comprising the parallel combination of a reactive impedance and a substantially constant negative resistance approximately equal in value to twice the impedance of the network as viewed from the branch.

6. A network in accordance with claim 5 in which said source and said load have substantially equal impedances.

7. A network in accordance with claim 5 in which said reactive impedance is adjustable.

8. A network in accordance with claim 5 in which said negative resistance is adjustable.

9. An all-pass network of the bridged-T type adapted for operation between a wave source and a load each having a resistive impedance $R_0$ comprising two resistors each approximately of value $R_0$ connected in series between said source and said load, a bridging branch of impedance Z connected to the outer terminals of said resistors, and an interposed shunt branch of impedance $R_0^2/Z$ connected to the common terminal of said resistors, said bridging branch comprising a reactive impedance and a negative resistance of the shunt type connected in parallel and said shunt branch comprising a reactive impedance and a negative resistance of the series type connected in series.

10. A wave transmission network of the bridged-T type adapted to operate between a wave source and a load each having a resistive impedance $R_0$ comprising two resistors each approximately of value $R_0$ connected in series between said source and said load, a bridging branch of impedance Z connected between the outer terminals of said resistors, and an interposed shunt branch connected to the common terminals of said resistors, said bridging branch comprising a negative resistance of the shunt type approximately equal to $-2R_0$ and a reactive impedance of value X connected in parallel and said shunt branch having an impedance approximately equal to $R_0^2/Z$.

11. A network in accordance with claim 10 in which said shunt branch comprises a reactive impedance approximately equal to $R_0^2/X$ and a negative resistance of the series type approximately equal to $-R_0/2$ connected in series.

12. A wave transmission network of the bridged-T type adapted to operate between a wave source and a load each having a resistive impedance $R_0$ comprising two resistors each approximately of value $R_0$ connected in series between said source and said load, a bridging branch connected to the outer terminals of said resistors, and an interposed shunt branch of impedance Z connected to the common terminal of said resistors, said shunt branch comprising a negative resistance of the series type approximately equal to $-R_0/2$ and a reactive impedance connected in series and said bridging branch having an impedance approximately equal to $R_0^2/Z$.

References Cited in the file of this patent

UNITED STATES PATENTS

| | | |
|---|---|---|
| 1,836,810 | Mason | Dec. 15, 1931 |
| 2,585,078 | Barney | Feb. 12, 1952 |